(12) United States Patent
Chiang et al.

(10) Patent No.: US 6,746,660 B1
(45) Date of Patent: Jun. 8, 2004

(54) PROCESS FOR THE PRODUCTION OF ULTRA-FINE ZEOLITE CRYSTALS AND THEIR AGGREGATES

(75) Inventors: Anthony Chiang, Taoyuan (TW); Ching Chuan Chen, Taipei (TW); Sajo P. Naik, Goa (IN)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 10/316,060

(22) Filed: Dec. 11, 2002

(51) Int. Cl.$^7$ ............................................. C01B 39/02
(52) U.S. Cl. ...................................... 423/702; 423/716
(58) Field of Search ................................ 423/702, 709, 423/712, 716

(56) References Cited

U.S. PATENT DOCUMENTS

| | | | | |
|---|---|---|---|---|
| 5,558,851 A | * | 9/1996 | Miller ........................ | 423/702 |
| 5,902,564 A | * | 5/1999 | Lujano et al. .............. | 423/702 |
| 6,004,527 A | * | 12/1999 | Murrell et al. ............. | 423/712 |
| 6,022,519 A | * | 2/2000 | Shimizu et al. ............ | 423/700 |
| 6,270,743 B1 | * | 8/2001 | Shimizu et al. ............ | 423/702 |
| 6,471,940 B1 | * | 10/2002 | Kurata et al. ............... | 423/707 |
| 6,521,207 B2 | * | 2/2003 | Oku et al. ................... | 423/705 |
| 6,558,647 B2 | * | 5/2003 | Lacombe et al. ........... | 423/702 |

* cited by examiner

Primary Examiner—David Sample
(74) Attorney, Agent, or Firm—Rosenberg, Klein & Lee

(57) ABSTRACT

A process for producing ultra-fine zeolite nanocrystals and their aggregates having an intracrystalline void within 1~10 nanometers in size that comprises at least as follows: preparing a transparent silicate-containing aqueous solution, with optional elements as Aluminum, Titanium and organic template molecules, known to produce zeolite; heating the solution under a temperature of 25°~100° C. for a certain period of time while keeping the solution still in a transparent state without forming colloidal zeolite; adding an anionic surfactant to precipitate the inorganic components; forming the dried inorganic-organic hybrid precipitate into a desired shape and then heating the shaped body with steam under a temperature of 100°~200° C. and a relative humidity of 30~85% for 1~3 days to produce ultra-fine zeolite crystals having a size below 30 nanometers, and aggregates of ultra-fine zeolite crystals with a large number of intracrystalline voids whose size is within 1~10 nanometers.

13 Claims, 19 Drawing Sheets

PROCESS FOR THE PRODUCTION OF ULTRA-FINE ZEOLITE CRYSTALS AND THEIR AGGREGATES

FIELD OF THE INVENTION

The present invention generally relates to a process for producing ultra-fine zeolite crystals and their aggregates, especially relates to the production of zeolite crystal aggregates containing a large quantity of intracrystalline voids whose size is between 1–10 nanometers.

BACKGROUND OF THE INVENTION

Zeolites are complex crystalline aluminosilicates that form a network of $AlO_4$ and $SiO_4$ tertrahedra linked by shared atoms. Other metals atoms may also be substituted into the framework. The negativity of the tetrahedra is balanced by the inclusion of inorganic cations such as sodium, or organic cations such as tetramethylammonium (TMA) or tetrapropylammonium (TPA), that are present in the synthesis. The interstitial spaces or channels formed by the crystalline network enable zeolites to be used as molecular sieves in separation processes and catalysts for chemical reactions and catalysts carriers in a wide variety of hydrocarbon conversion processes.

Most of the zeolites produced by conventional process are in the form of 0.5–1 micron crystals. An exception is the method recently invented by Otterstedt et al., (U.S. Pat. No. 5,863,516) where colloidal suspension of zeolite with particle size less than 0.2 micron, or 200 nanometers, was produced from a clear silica aluminum solution. Although said pending method claimed that a variety of zeolite could be made into particles smaller than 200 nanometers, no lower bound of the particle size was ever specified. Nevertheless, from the examples provided by the patent documents, it is clearly observed that the minimum average particle diameter obtainable by the said method was 37 nanometers.

Crystal, by definition, is a material with translation symmetry. In other words, atoms are arranged in repeated manner so that the same atom appears at the same location after a crystal is moved a fixed distance. The smallest repeating unit is called a crystallographic unit cell. To be considered as a crystal, a material must contain at least five unit cells in every direction. This is because it takes at least three successful units to confirm the repetition, while the outermost unit cells are under a different environment thus cannot be an exact repetition of the inner ones.

Although there are many kinds of zeolite structures known to date, generally speaking, the smallest dimension of the unit cell in these structures is never much less than 1.0 nanometer. By the above argument, the minimum size of a substance that can be called zeolite should be around 5 nanometers.

If a substance displays the repeated atomic structure of a particular type of zeolite in one direction but not in other directions, it cannot be called a zeolite. For example, Kirschhock et al., and Ravishankar et al., (1–6) have published a method for the preparing of so-called "MFI zeolitic nanoblocks". The nanoblocks they acquired was made of pure silica and exhibited some characteristics of MFI zeolite, but its size did not reach 5 repeating unit cells in one direction, thus cannot be called a zeolite. In fact, not only is the substance unstable under high temperature calcination, but also lacks the hydrophobic characteristic of pure silica MFI zeolite. It is therefore not MFI zeolite.

Thus, there is a need for a process that produces zeolites larger than 5 nanometer in size but smaller than the 30 nanometer colloidal crystals disclosed by U.S. Pat. No. 5,863,516.

SUMMARY OF THE INVENTION

A main purpose of this invention is to provide a method for the preparation of ultra-fine zeolite crystals whereas the size of said crystal is between 5–30 nanometers.

Another purpose of this invention is to provide a method for the preparation of zeolitic material as strongly bonded aggregates of said ultra-fine zeolite crystals thus leaving a large amount of intracrystalline voids whose size is between 1 to 10 nanometers.

The benefit of smaller zeolite crystals and large number of intercrystalline void:

Smaller zeolite crystals have more external surface area per mass than larger ones. This is important for catalytic reactions of large molecules that cannot enter the micropores (0.3~0.9 nm) of zeolite but can react on the external surface of zeolite crystals. The large number of intercrystalline void enables the diffusion of large molecules to the surface of zeolite nano-crystals. If small zeolite crystals are tightly bonded into a dense mass without intercrystalline void, their external surface area will not be accessible to large molecules, and the benefit of small crystal size will be lost. The size of intercrystalline void is not that important in this sense, but smaller void usually related to higher specific surface area of the void. The particle size of the ultra-fine zeolite crystals synthesized with the conditions according to the present invention is larger than 5 unite cells, or about 5 nanometer, but smaller than that of the colloidal zeolites synthesized conditions as Otterstedt et al., or smaller than 30 nanometers. The present invention differs from the international patent WO97/17290, which produces layer type material with zeolite structure in only two-dimension from the exfoliation of precursor for zeolite MCM-22.

This invention discloses a method for the production of ultra-fine zeolite crystals wherein the process comprises of preparing a transparent silicate-containing aqueous solution, which may also contains other components such as Aluminum, Titanium and organic template molecules that is known to produce zeolite; reacting said solution under 25~100 deg C. for a period of time while the solution remains in transparent without producing colloidal zeolite; adding an anionic surfactant to flocculate the silicates components; drying and forming the flocculated organic/inorganic hybrid mass into shape; heating the shaped mass with water vapor at a temperature of 100–200 deg C. for 1–3 days to produce nanometer zeolite crystals whose crystal size is within 5~30 nanometers: According to the choice of the process conditions, the product could be loosely bonded zeolite crystals or tightly aggregated crystals containing large amount of intracrystalline voids with size between 1–10 nanometers.

To help the audit commissioner further understand the above-mentioned purpose of this invention as well as the structure characteristic of its outcomes, the details are explained with figures attached as below:

DETAILED DESCRIPTION OF THE PREFERRED EMBODIMENTS

Recently Otterstedt et al., invented a method for producing colloidal zeolite with particle size smaller than 0.2 micron (200 nanometer) from clear aluminum silicate solution (U.S. Pat. No. 5,863,516). Although said method claims to be capable of manufacturing zeolite crystals smaller than 200 nanometer without specifying its lower size limit, it is seen from the examples provided by the patent document that the smallest zeolite produced by said method has an average diameter of 37 nanometer, whereas the size of the zeolites provided by this invention is smaller than 30 nanometer on its average which could be advantage to many applications.

Figure 1:
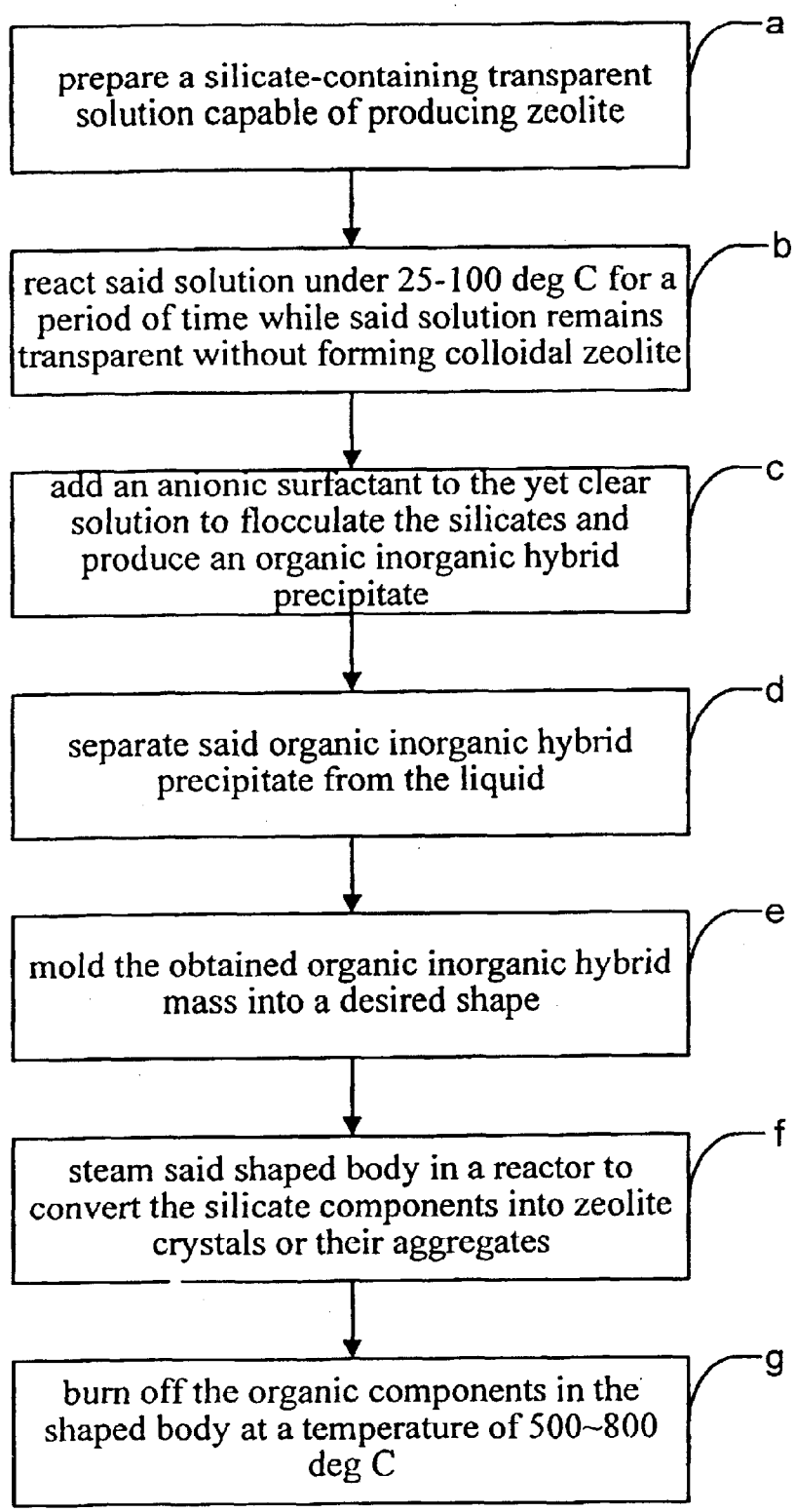
FIG. 1 is the process flow sheet of one preferred embodiment according to the present invention.

Please refer to FIG. 1, which is the process flow sheet of one preferred embodiment according to the present invention; as shown in the Figure, the major steps of the process for producing ultra-fine zeolite crystals according to the present invention are comprised of:

Step (a), prepare a silicate-containing transparent solution capable of producing zeolite;

Step (b), react said solution under 25–100 deg C. for a period of time while said solution remains transparent without forming colloidal zeolite;

Step (c), add an anionic surfactant to the yet clear solution to flocculate the silicates and produce an organic inorganic hybrid precipitate;

Step (d), separate said organic inorganic hybrid precipitate from the liquid;

Step (e), mold the obtained organic inorganic hybrid mass into a desired shape;

Step (f), steam said shaped body in a reactor to convert the silicate components into zeolite crystals or their aggregates;

Step (g), bum off the organic components in the shaped body at a temperature of 500–800 deg C.

Said silicate-containing transparent solution of step (a) may also contains elements such as Aluminum or Titanium or organic template molecules such as TPAOH or other template molecules well-known to the manufacturing zeolites; wherein the reaction time in step (b) is 10 hours–48 hours, where a small dosage of anionic surfactant less than 1% of the weight of the silicates in the solution could be added during the heating to protect the zeolite precursors so-that the heating time could be prolonged while maintaining the transparency of the solution without producing colloidal zeolite crystals; wherein the pH value of the heated clear solution produced in step (b) could be adjusted to between 10–11 by adding minute amounts of dilute acid if loosely aggregated zeolite crystals were to be produced wherein the acid used could be any one of the inorganic acids such as sulfuric acid, nitrogen acid or hydrofluoric acid;

In step (c) the amounts of anionic surfactant added is 20–40% of the weight of the oxide contained in the above-mentioned clear solution wherein the anionic surfactant should be dissolved in ethanol first to make a solution containing 2% anionic surfactant; for more effective flocculation after the addition of anionic surfactant, continue agitation or warm-up of the mixture may be needed; the organic/inorganic hybrid flocculants produced could be collected through any solid/liquid separation method known to the chemical industry such as filtration or centrifugation. In step (d) the organic-inorganic hybrid flocculants can be molded into shape and dried by any method available.

In step (e) wherein a high temperature steam is provided from outside or self-generated in the reactor to heat the shaped organic-inorganic hybrid body to 100~200 deg C. for 1~3 days under a relative humidity between 30~85%; in step (g), the organic component in the shaped body is burned off under the temperature of 500~800 deg C. by providing air or providing an inert gas first and the air to produce ultra-fine zeolite crystals or their aggregates wherein the crystal size produced by said method is larger than 5 nanometers but smaller than 30 nanometers; wherein the aggregates have a large amount of intracrystalline voids whose size is 1~10 nanometer.

The benefit of smaller zeolite crystals and large number of intercrystalline void:

Smaller zeolite crystals have more external surface area per mass than larger ones. This is important for catalytic reactions of large molecules that cannot enter the micropores (0.3~0.9 nm) of zeolite but can react on the external surface of zeolite crystals. The large number of intercrystalline void enables the diffusion of large molecules to the surface of zeolite nano-crystals. If small zeolite crystals are tightly bonded into a dense mass without intercrystal line void, their external surface area will not be accessible to large molecules, and the benefit of small crystal size will be lost. The size of intercrystalline void is not that important in this sense, but smaller void usually related to higher specific surface area of the void.

EXAMPLE 1

Comparative Example

Figure 2:
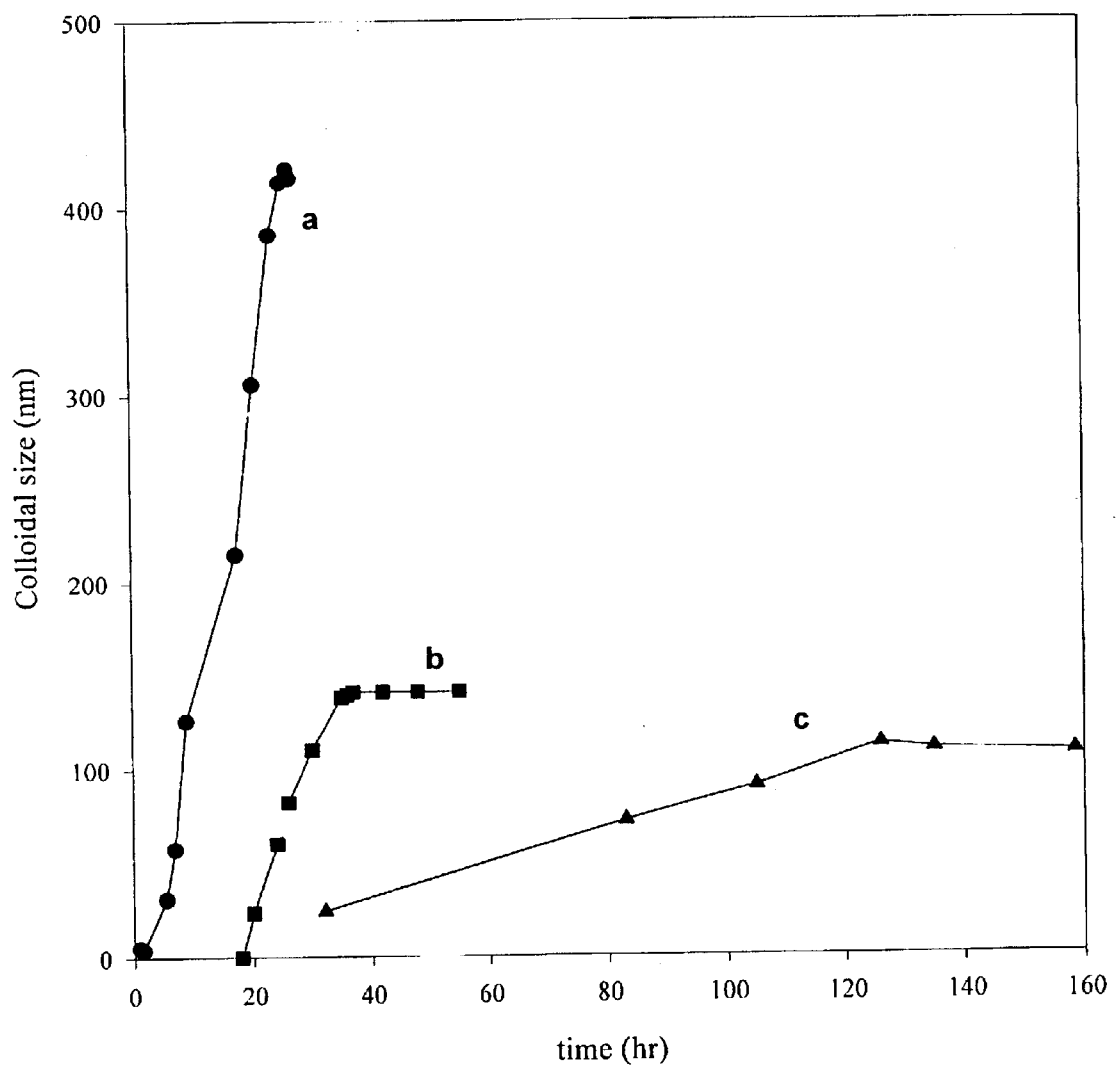
FIG. 2 is the growth curve of the TPA-silicalite in the example 1 of one preferred embodiment at (a) 100 deg C. (b) 80 deg C. (c) 60 deg C. according to the present invention.

The formation of colloidal silicalite after heating a clear silicate solution for a long time: take 14.12 g aqueous solution containing 20% TPAOH and dilute with 68 g de-ionized water then mixed with 11.57 g of TEOS. After about 45 minutes of strong agitation, the TEOS is hydrolyzed and the mixture becomes a clear solution, whose pH value is about 11.3. Put said clear solution inside a container and heat it to 100 deg C., 80 deg C. or 60 deg C. and an ivory white colloidal suspension is formed after prolong heating wherein there contains pure silica zeolite (silicalite) crystals of 100–500 nanometer sizes. The formation and growth of the colloidal silicalite during the heating process can be examined by sampling the produce at various heating time and analyzed with dynamic light scattering technique as demonstrated in the FIG. 2. From this example it proves that the product acquired from the method invented by Otterstedt et al., (U.S. Pat. No. 5,863,516) is the suspended colloidal zeolite particles.

EXAMPLE 2

Figure 3A:
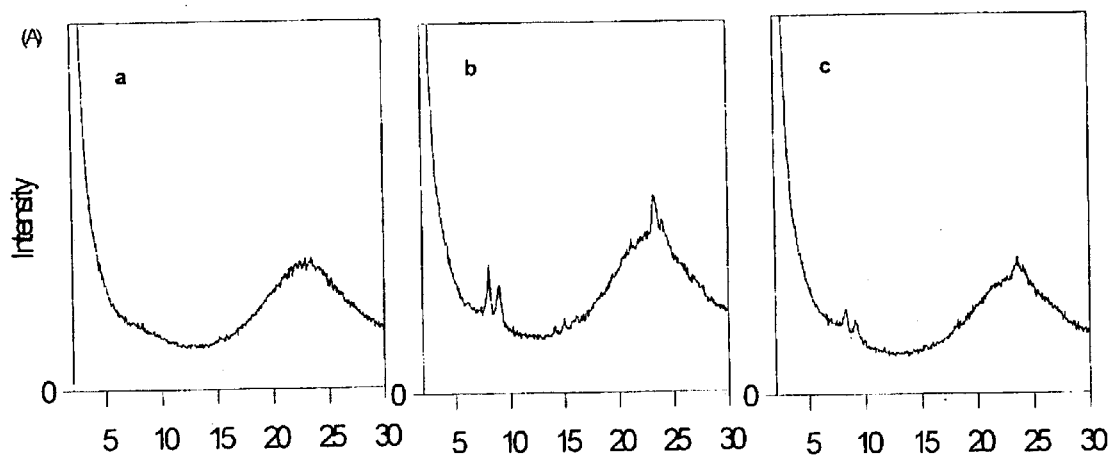
FIG. 3A is the XRD patterns of the example 2 of one preferred embodiment treating with 110 deg C. water vapor for (a) 7 hours (b) 15 hours (c) 24 hours according to the present invention.
Figure 3B:
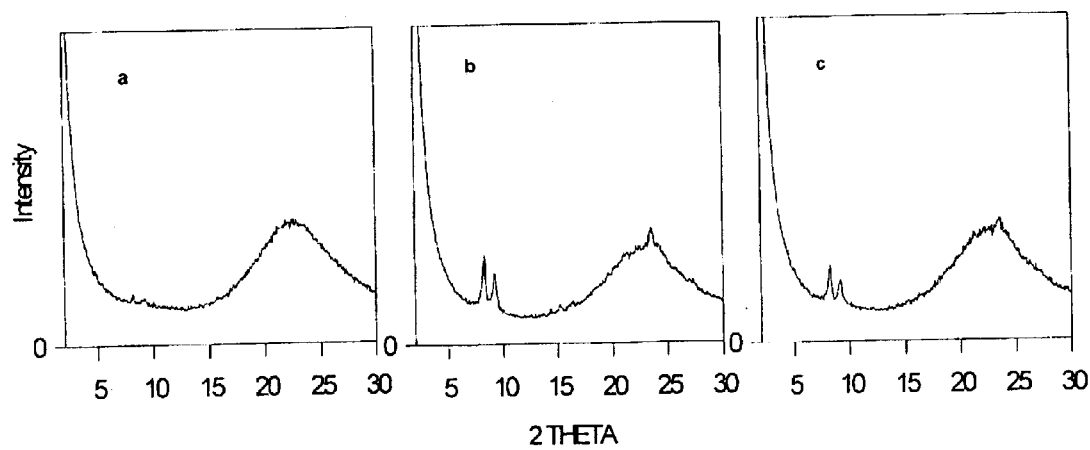
FIG. 3B is the XRD patterns of the example 2 of one preferred embodiment treating with 110 deg C. water vapor for (a) 7 hours (b) 15 hours (c) 24 hours then calcined at 550 deg C., then treated again with 150 deg C. water.
Figure 4A:
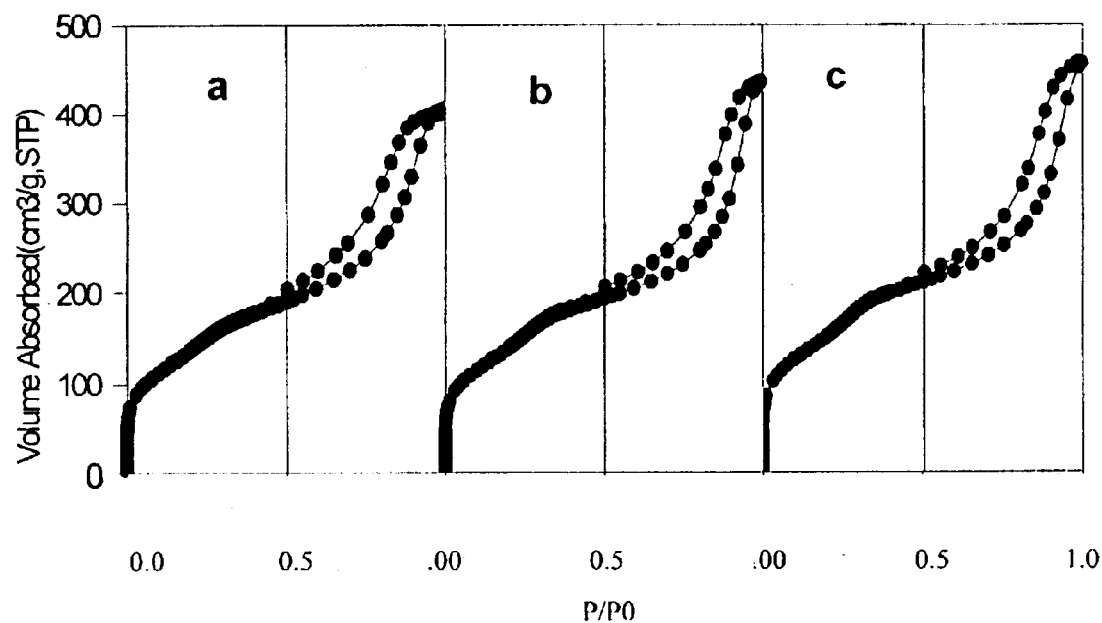
FIG. 4A is the 77 deg K. nitrogen adsorption isotherms of the example 2 of one preferred embodiment treating with 110 deg C. water vapor for (a) 7 hours (b) 15 hours (c) 24 hours, then calcined at 550 deg C. according to the present invention.
Figure 4B:
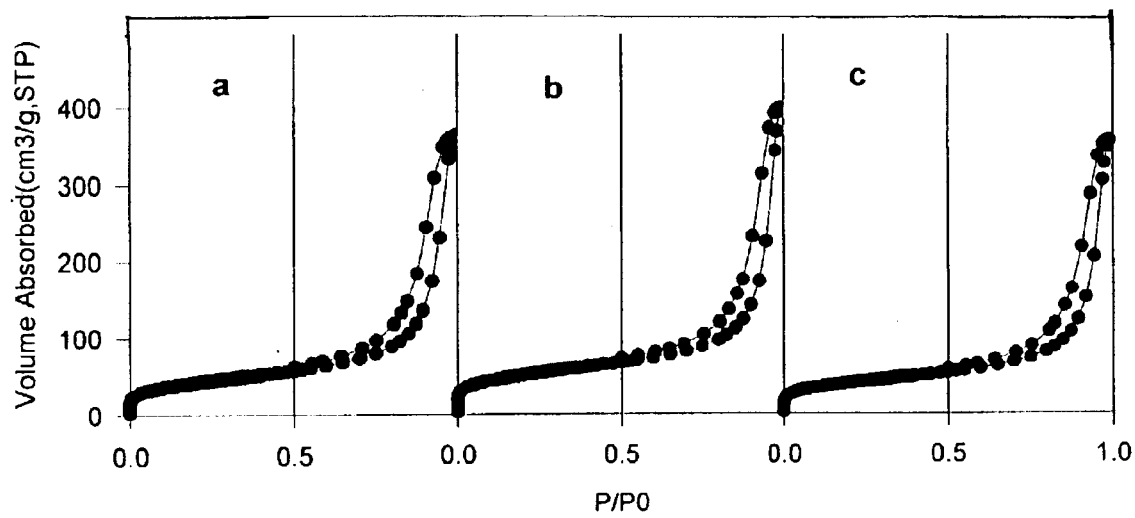
FIG. 4B is the 77 deg K. nitrogen adsorption isotherms of the example 2 of one preferred embodiment treating with 110 deg C. water vapor for (a) 7 hours (b) 15 hours (c) 24 hours, then heated again with 150 deg C. water vapor after calcined at 550 deg C. according to the present invention.

Flocculation of zeolite precursors with surfactant and steam treating the hybrid solid: take the clear solution prepared as the above example and heat at 100 deg C. for just 7 hours, which is before the beginning of colloidal zeolite formation according to the extrapolation of the growth curves showed in FIG. 1 to zero size. Consequently, the solution remains transparent and its contain is at best precursors to zeolite. Adjust the pH value of the solution to about 9.6 with minutes of sulfuric acid and then add a solution containing 1.01 g CTABr and 54.27 g ethanol, thus produce fluffy white flocculants. Recover the flocculants by filtration and rinse it with 200 ml water, dry it under room temperature for a day, and dry further at 70 deg C. for 3 hours and thus obtain 6.78 g of organic-inorganic hybrid solid. Press said solid into disks under a pressure of 400 kg/m$^2$ then put the disks inside a reactor to treat with 110 deg C. steam for 7–24 hours, thus convert the zeolite precursors into zeolite crystals, whose presence is proved by the XRD patterns showed in FIG. 3A. From the 77 deg K. nitrogen adsorption isotherm showed in FIG. 4A, the BET specific surface area of these solids is 500~550 m$^2$/g after 550 deg C. calcinations. However, the structure of said solids is not robust. If the calcined product is put into water and heated to 150 deg C., the zeolite structure remains as showed in FIG. 3B intracrystalline structure between zeolite changes as showed by FIG. 4B. The specific surface area is reduced to about 150~180 m$^2$/g.

EXAMPLE 3

To Increase the Amount of the Surfactant

The procedures are the same as that of the example 2, but the CTABr surfactant content is increased to 2.03 g. The flocculants was stirred for just 3 hours in the liquid before they are filtered, dried and pressed into disks. The steam treatment duration is extended to 36 hours. The result is practically the same as before except that the weight of the flocculants collected is slightly less and the intensity of the zeolite X-ray diffraction peaks is slightly increased.

EXAMPLE 4

Steaming of the Hybrid Solid Obtained by Surfactant flocculation of a clear silicate solution without the 100 deg C. 7 hours heating step.

Figure 5A:
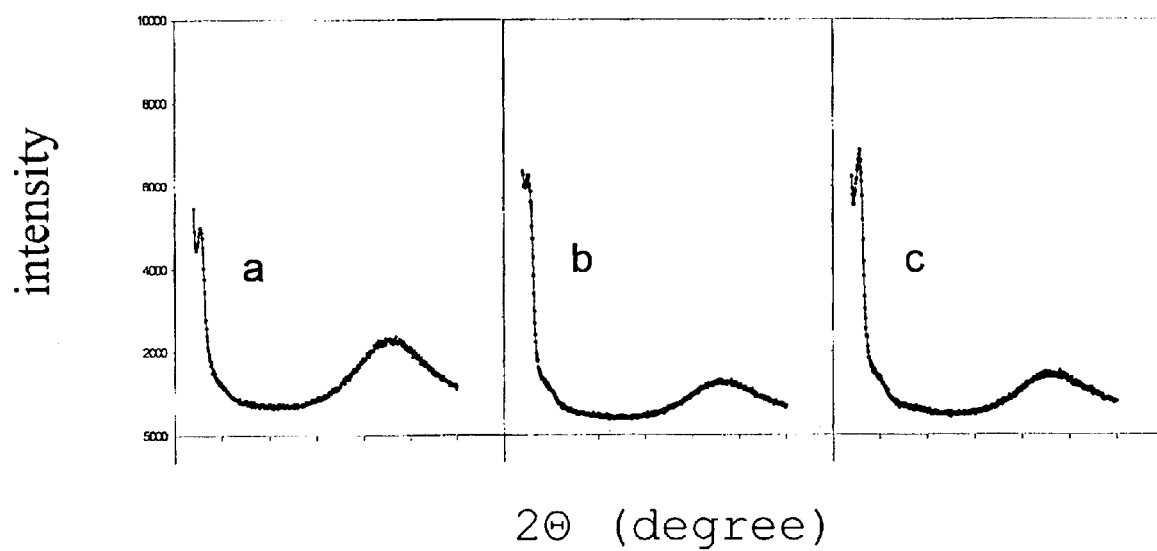
FIG. 5A is the XRD patterns of the example 4 of one preferred embodiment treating with 11 deg C. water vapor for (a) 0 hour (b) 24 hours (c) 36 hours according to the present invention.
Figure 5B:
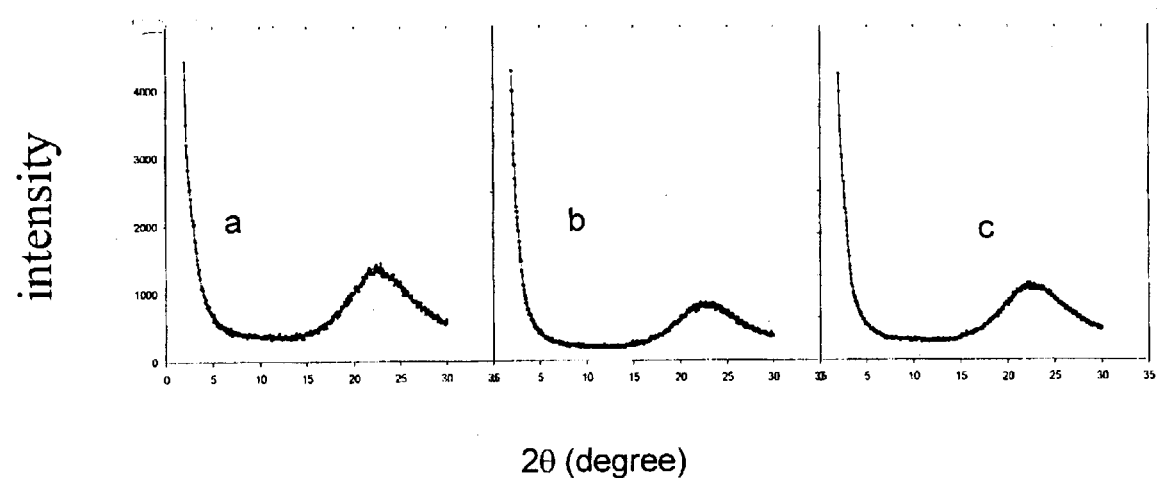
FIG. 5B is the XRD patterns of the example 2 of one preferred embodiment treating with 110 deg C. water vapor for (a) 0 hour (b) 24 hours (c) 36 hours, then again treated with 150 deg C. water vapor after calcined at 550 deg C. according to the present invention.
Figure 6A:
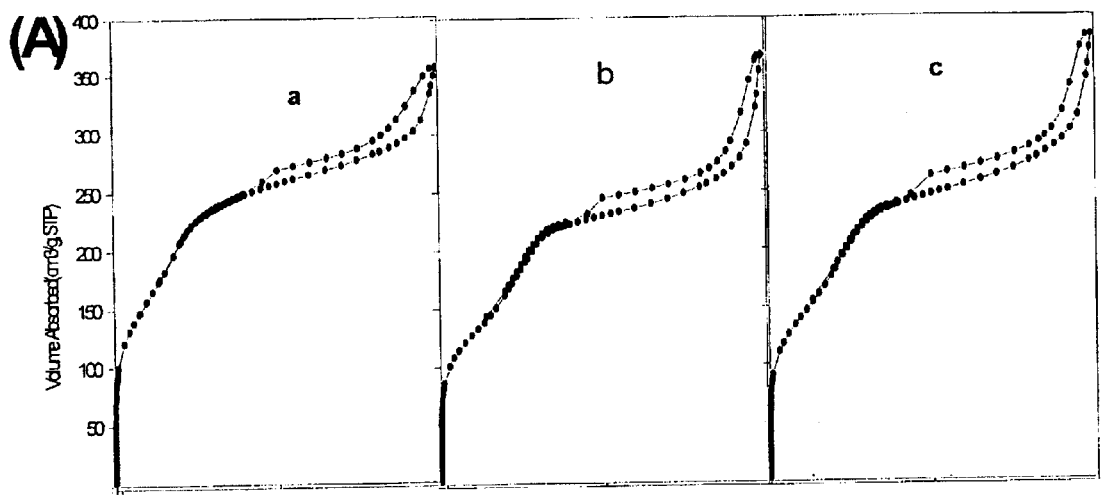
FIG. 6A is the 77 deg K. nitrogen adsorption isotherms of the example 4 of one preferred embodiment treating with 110 deg C. water vapor for (a) 0 hours (b) 24 hours (c) 36 hours, than calcined with 550 deg C. according to the present invention.
Figure 6B:
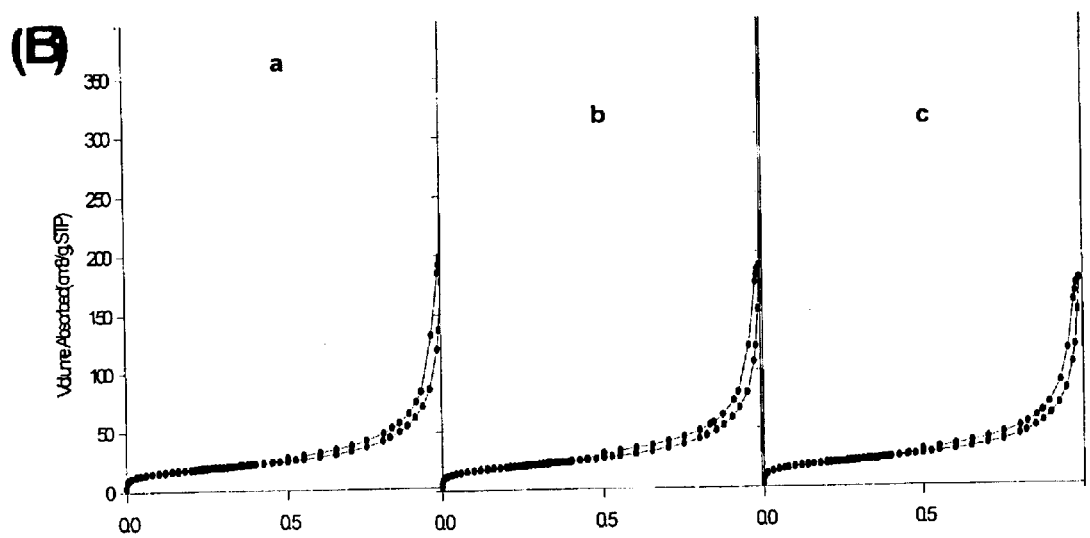
FIG. 6B is the 77 deg K. nitrogen adsorption isotherms of the example 4 of one preferred embodiment treating with 110 deg C. water vapor for (a) 0 hour (b) 24 hours (c) 36 hours, the again treated with 150 deg C. water vapor after calcined at 550 deg C. according to the present invention.
Figure 7:
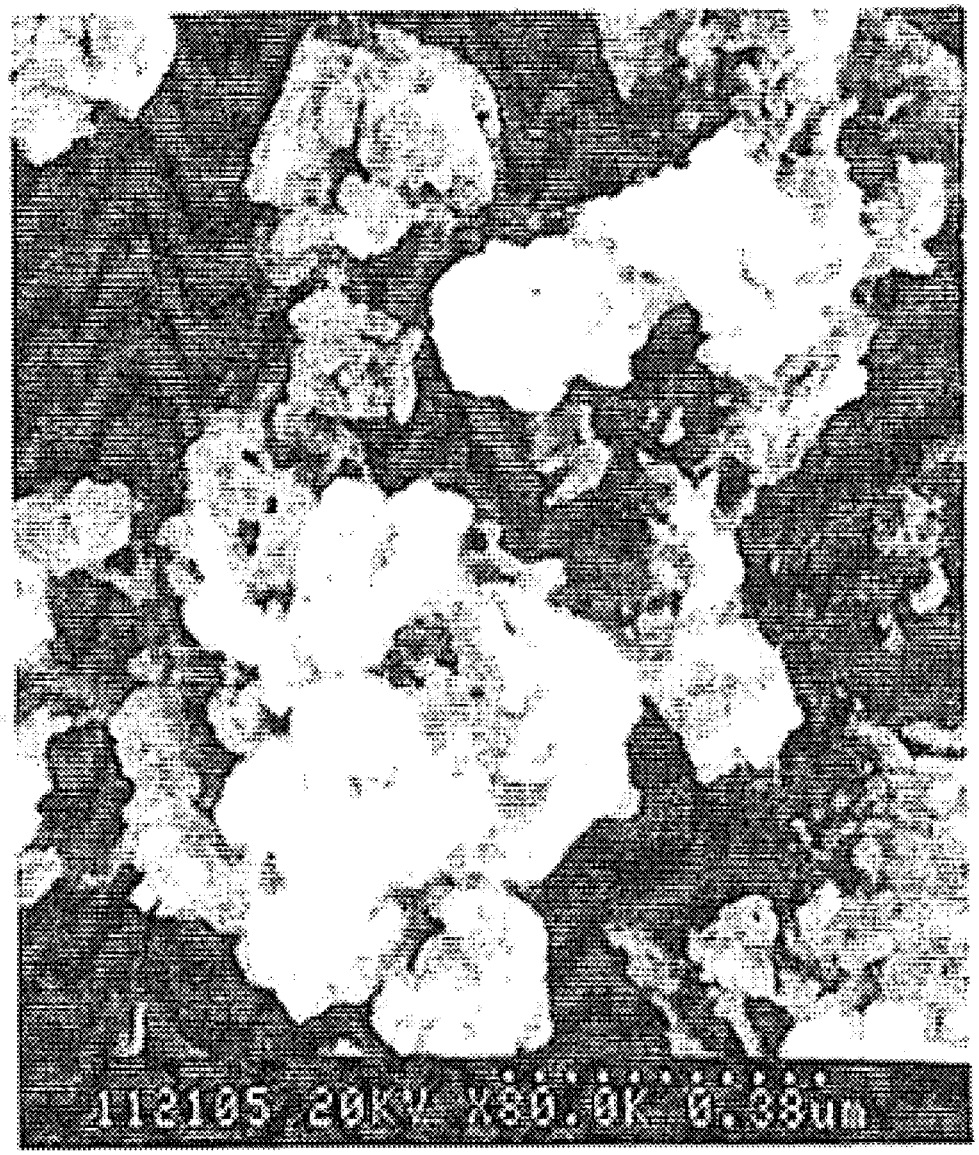
FIG. 7 is the Scanning Electron Microscope picture of the example 4 of one preferred embodiment after calcinations according to the present invention.

The recipe is the same as example 2, wherein the TPAOH/TEOS/H$_2$O clear solution obtained after 45 minutes of strong agitation is not heated and directly added to the CATBr/EtOH solution. The pH value of the resulted viscose mixture is slightly higher than 11.9. Adjust the pH value to 8.9 by adding dilute sulfuric acid. Said viscose mixture is heated to 100 deg C. for 3 hours before its solid contains are separated. 54.3 g of solid is obtained after drying at room temperature and 70 deg C. The organic-inorganic hybrid solid is pressed into disks and treat with 110 deg C. steam for 24 or 36 hours. The samples acquired from this experiment exhibit low-angle diffraction peak as showed in FIG. 5A typical for ordered mesoporous materials, but no zeolite diffraction is observed. From the 77 deg K. nitrogen adsorption isotherms showed in FIG. 6A, a specific surface area of 580~760 m$^2$/g is found. From the SEM microgram (FIG. 7) it is seen that the solid consists of 100~300 nm particles gathered into lumps. The calcined solid is poor in hydrothermal stability. As demonstrated by FIG. 5B, FIG. 6B for samples heated to 150 deg C. in water after calcination. The specific surface area reduces to ~70 m$^2$/g after such treatment.

EXAMPLE 5

Using Water Instead of Ethanol as the Solvent for the Surfactant

Figure 8:
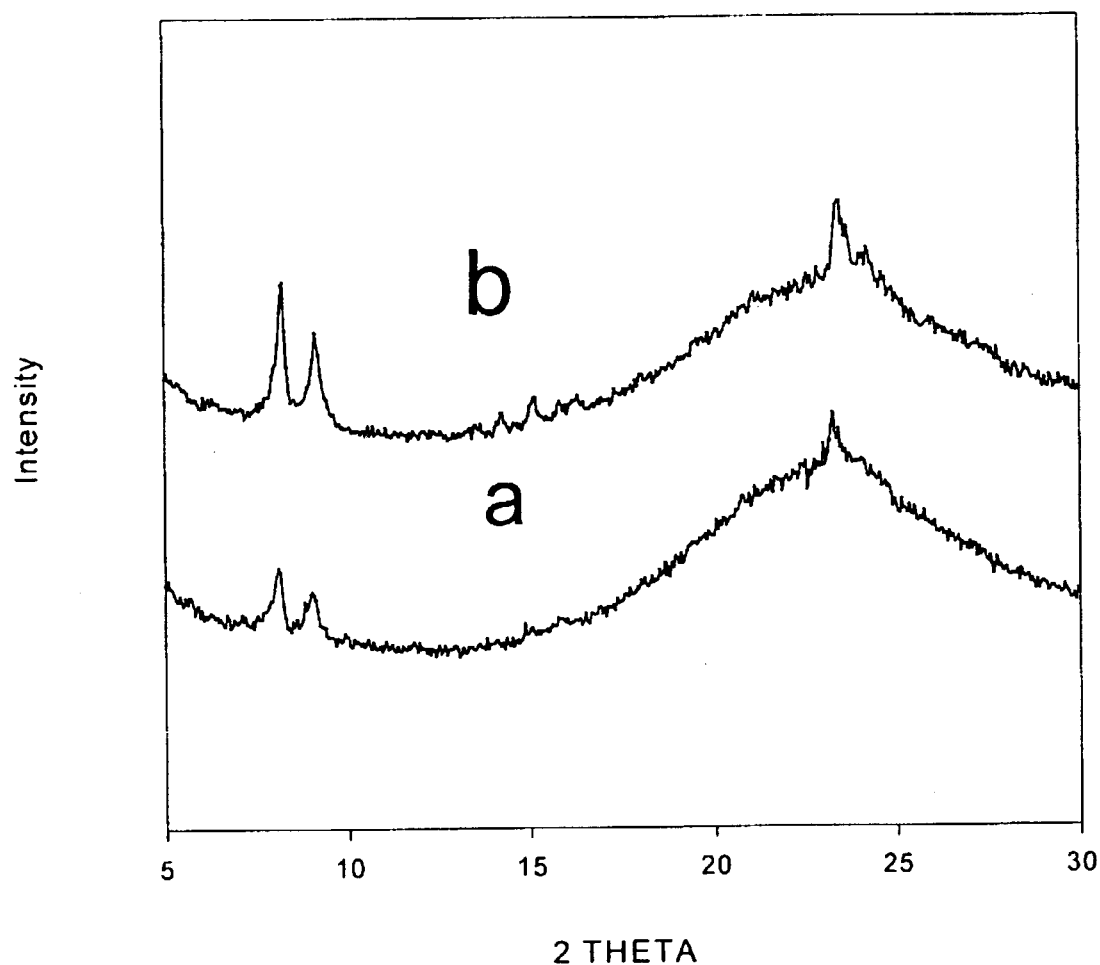
FIG. 8 is the XRD patterns of the example 5 of one preferred embodiment treating with 110 deg C. water vapor for (a) 24 hours (b) 36 hours according to the present invention.
Figure 9:
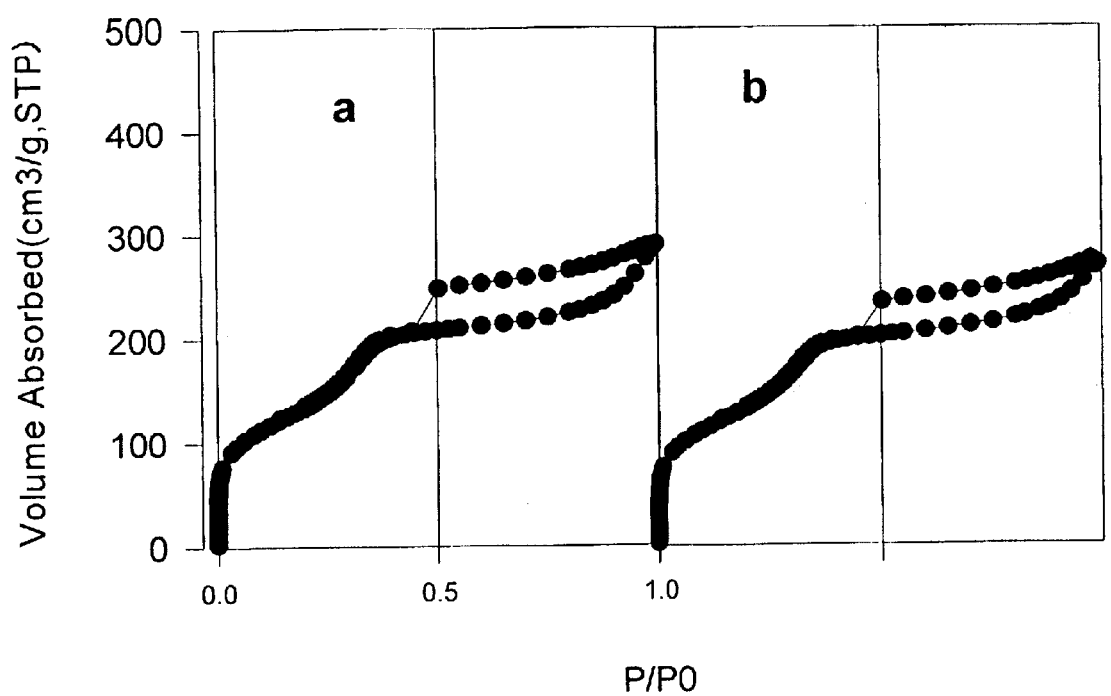
FIG. 9 is the 77 deg K. nitrogen adsorption isotherms of the example 5 of one preferred embodiment treating with 110 deg C. water vapor for (a) 24 hours (b) 36 hours, then calcined at 550 deg C. according to the present invention.

The procedures are the same as in example 2. However, 67.54 g de-ionized water is used to dissolve the required 1.01 g CTABr. The pH value of the clear zeolite-precursor solution obtained after heating at 100 deg C. for 7 hours is adjusted from 11.4 to 9.7 using the sulfuric acid. The aqueous surfactant solution (pH=6.2) is added. Flocculants are immediately formed whereas the pH value of the mixture is 9.5. The mixture is stirred for 3 hours before its solid contains filtered, washed with the 200 ml de-ionized water, dried and pressed into disks. The shaped organic-inorganic hybrid material is then subjected to steam treatment for 24 or 36 hours at 110 deg C. as before. The product obtained showed small but distinct characteristic diffraction peaks of MFI zeolite (FIG. 8). Its surface area is about 480~540 m2/g, but its pore structure is obviously different from that of the product in example 2 (FIG. 9).

EXAMPLE 6, 7

Increasing the Steam Treatment Temperature to 150 deg C.

Figure 10:
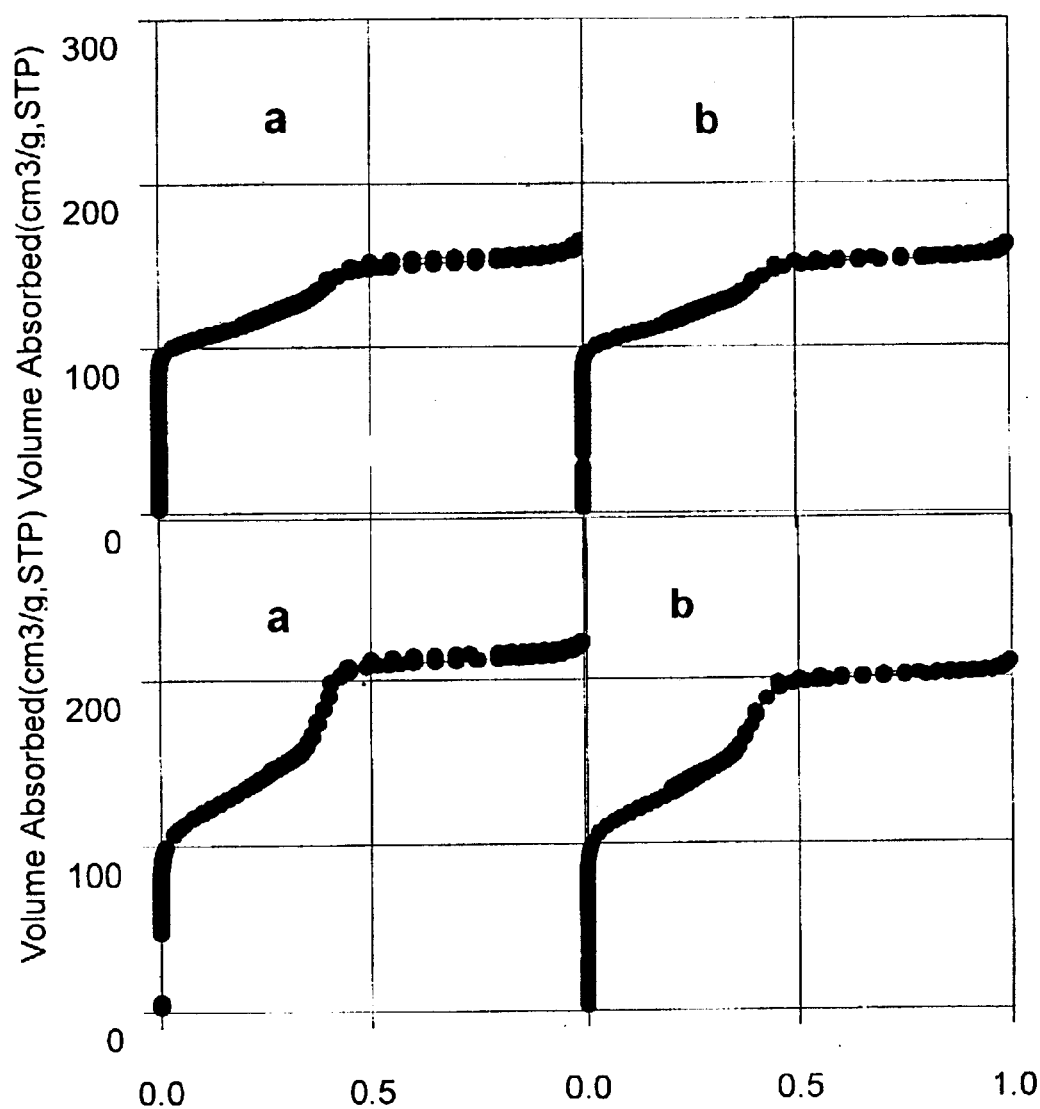
FIG. 10 is the 77 deg K. nitrogen adsorption isotherms of the example 6 and the example 7 of one preferred embodiment treating with 110 deg C. water vapor for (a) 24 hours (b) 36 hours, then calcined at 550 deg C. according to the present invention.

The procedures are the same as example 2 and example 5, however, the steam treatment is now performed at 150 deg C. Furthermore, ethanol is used to rinse the collected solid when alcoholic surfactant was used to flocculate the silicates, while water was used to rinse the solid when it was prepared from aqueous surfactant. The products after steam treatment are aggregates of zeolite crystals. The size of the crystals varies from a few micrometers to about 200 nm. The 77 deg K. nitrogen adsorption isotherms are shown in FIG. 10. Because of the larger crystal size the total amount of nitrogen adsorption at saturation is less than that of the previous examples. However, the adsorption isotherms show distinct turning point at 0.4 relative pressure which represents the intracrystalline voids are about 3 nm.

EXAMPLE 8

Lower the steam treatment temperature to 130 deg C., but prolong the 100 deg C. hydrothermal reaction time during the preparing of the zeolite precursors.

Since the zeolite produced was too small when steamed at 110 deg C., but too large when steamed at 150 deg C., it is determined to try the steam treatment at 130 deg C. Further, the zeolite precursor produced by 100 deg C. hydrothermal reaction for 7 hours may not be the best precursor possible. We therefore tried to increase this reaction time. However, faint scattering was noticed if we prolong the 100 deg C. heating to 10 hours. This suggests the nucleation of colloidal zeolites that contrary to our interest. The following steps are thus taken to avoid the formation of zeolite nuclei.

Figure 11:
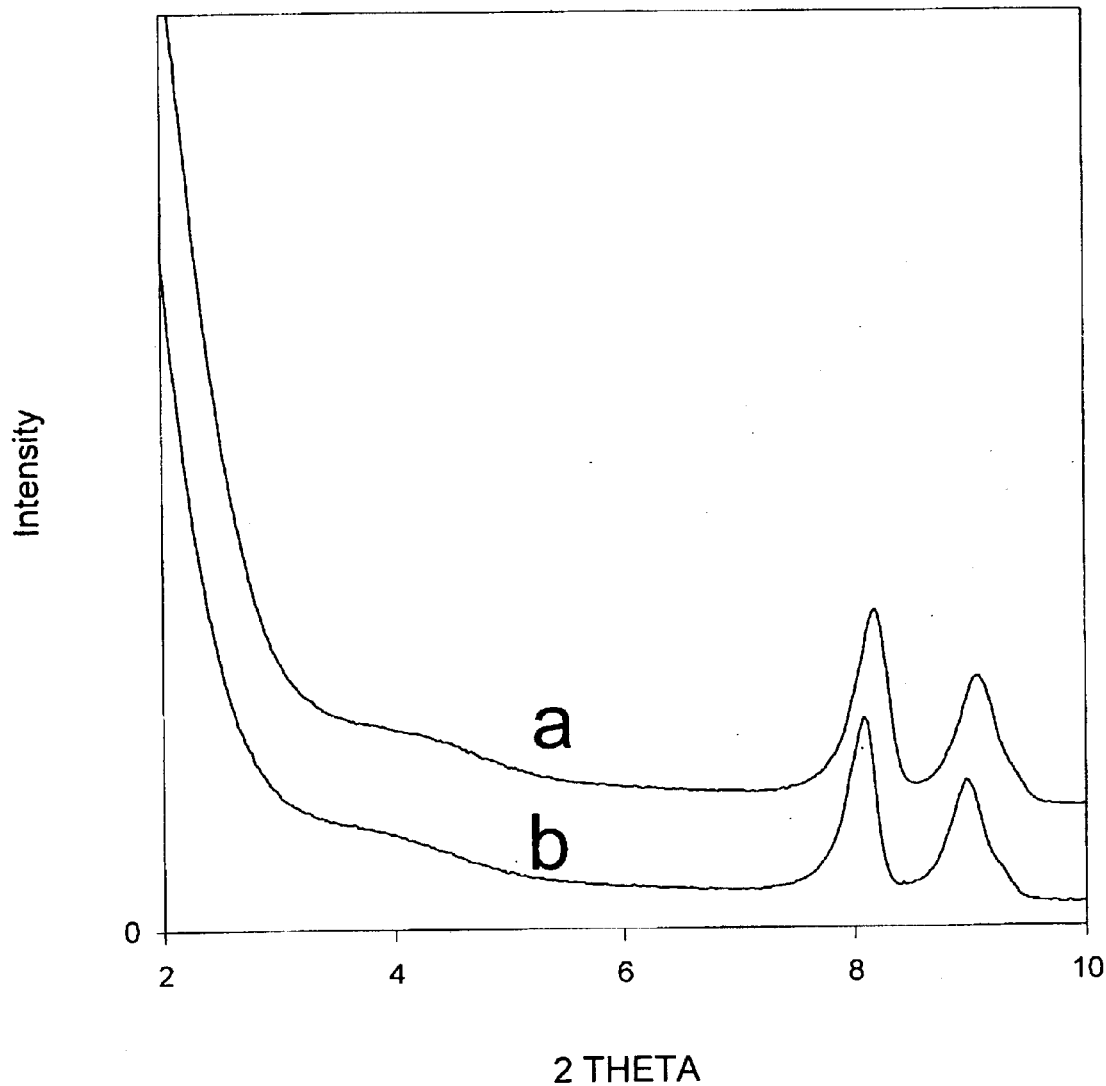
FIG. 11 is the XRD patterns of the example 8 of one preferred embodiment treating with 130 deg C. water vapor for (a) 24 hours (b) 36 hours, then calcined at 550 deg C. according to the present invention.
Figure 12:
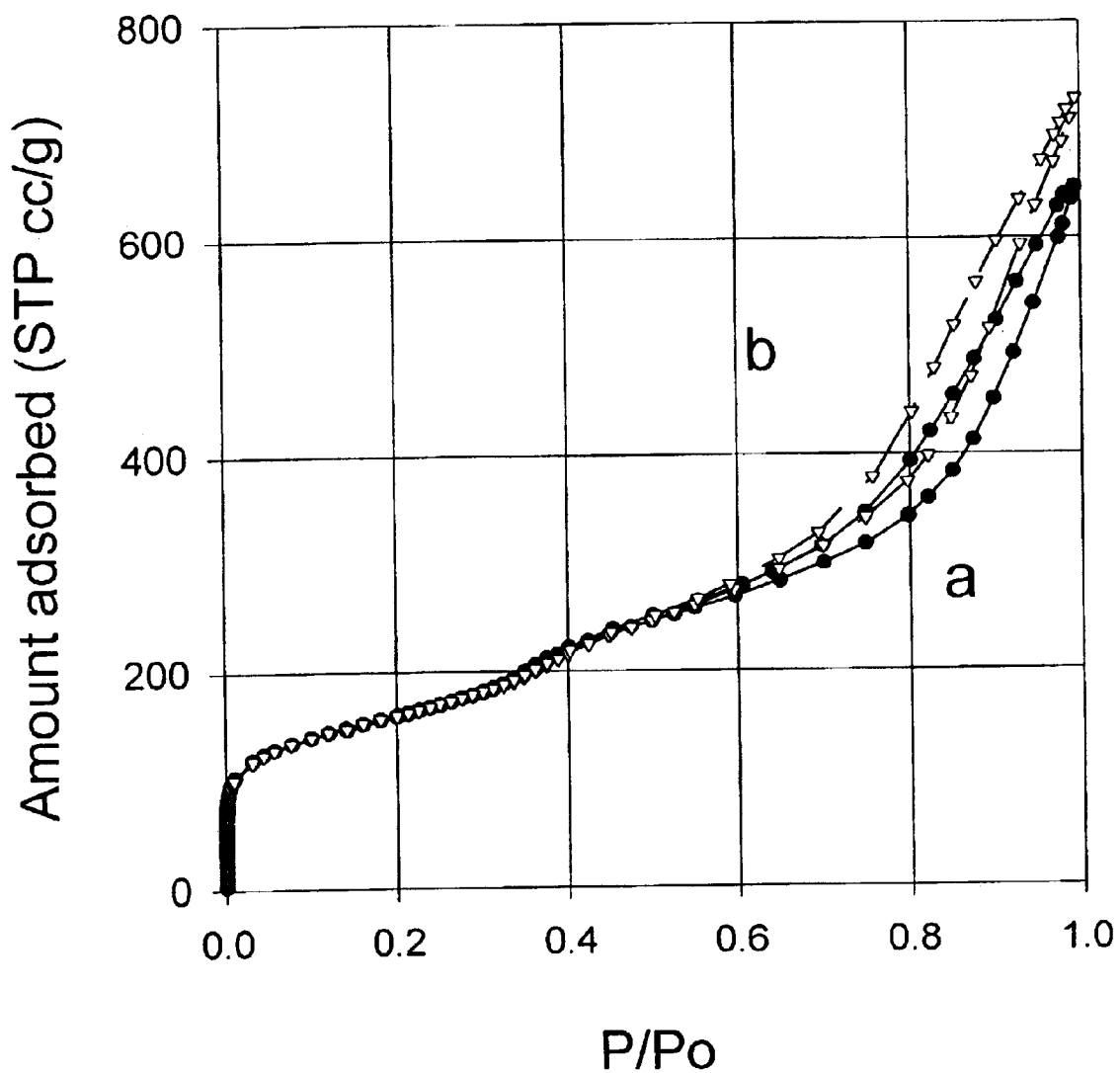
FIG. 12 is the 77 deg K. nitrogen adsorption isotherms of the example 8 of one preferred embodiment treating with 130 deg C. water vapor for (a) 24 hours (b) 36 hours, then calcined at 550 deg C. according to the present invention.

Take 14.1323 g of 20 wt % TPAOH aqueous solution, add 68.7203 g de-ionized water and 11.5812 g TEOS. Stir for 45 minutes (pH=10.87) and put it in a polypropylene bottle, react for 7 hours (pH=11.31) at 100° C. After cooling to room temperature, add a 0.0259 g CTABr/54.2704 g H$_2$O solution and the pH value of the mixture reaches 11.85. The surfactant protected precursor solution is heat again at 100 deg C. for another 7 hours. The pH value of the final protected precursor solution is 12.07. Add diluted sulfuric acid to decrease the pH value until 9.89. Concentrate the solution to 16.1926 g with a rotary evaporator. Prepare another solution of 3.3832 g-CTABr/6.7905 g H$_2$O/1.7216 g EtOH. Add the concentrated precursor to the surfactant solution to produce flocculants, continue the stirring for 3 hours. Dry the mixture under hood to obtain a solid covered with needle shaped crystals. Press the solid into disks and then treat with 130 deg C. steam. The XRD pattern and the nitrogen adsorption isotherm of calcined product are given in FIG. 11 and FIG. 12.

EXAMPLE 9

110° C. Hydrothermal Treatment of the Hybrid Solid in Water Instead of Steam Treatment The inorganic-organic hybrid precursor is prepared the same way as example 8; however, instead of steam treatment it is immersed in water in a high-pressure reactor and reacted at 110 deg C. for 24 and 36 hours. The XRD and nitrogen adsorption results similar to that of the previous example.

EXAMPLE 10

To Produce 30 Manometer Zeolite Crystals

Figure 13:
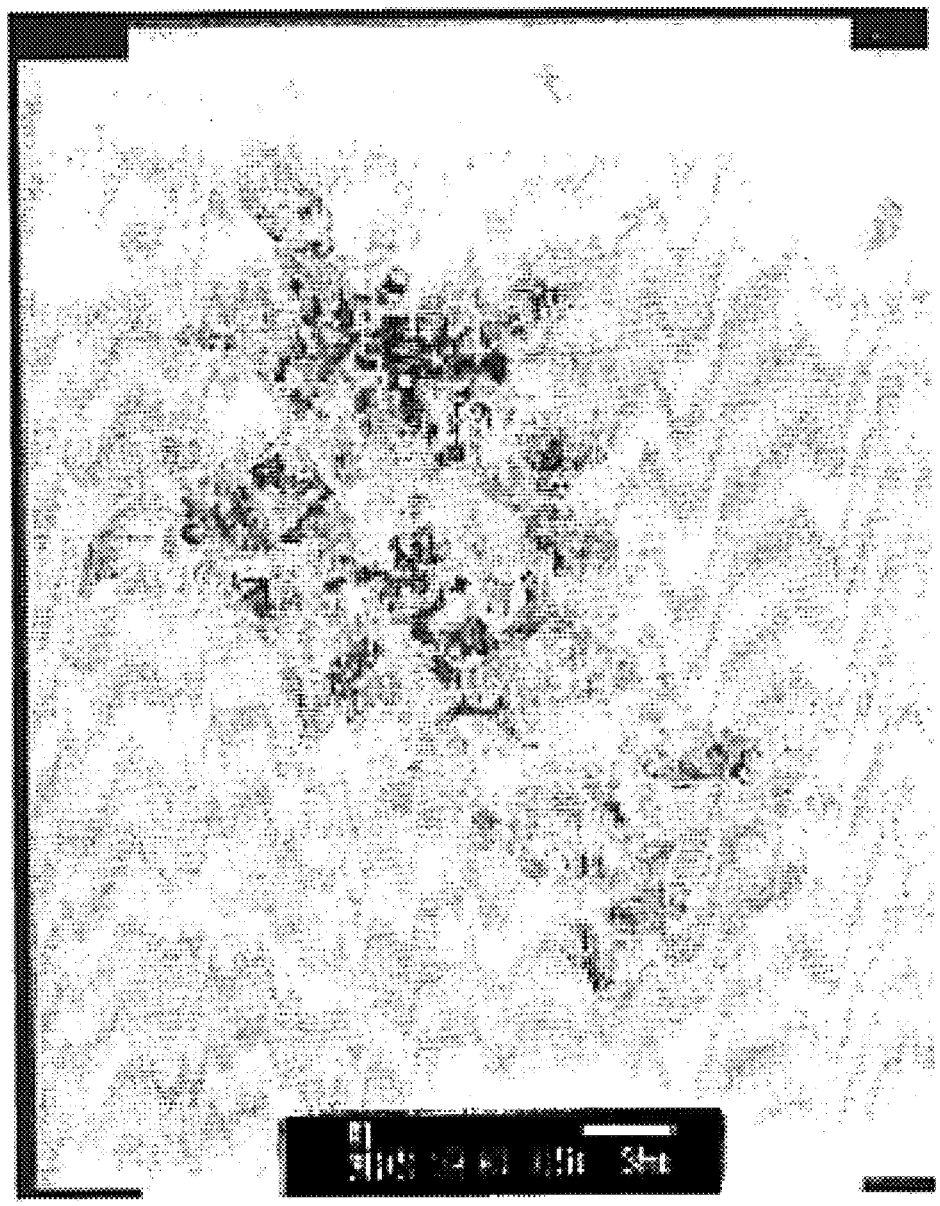
FIG. 13 is the TEM picture of the example 10 of one preferred embodiment treating with 150 deg C. water vapor for 24 hours and then calcined at 550 deg C. according to the present invention.
Figure 14:
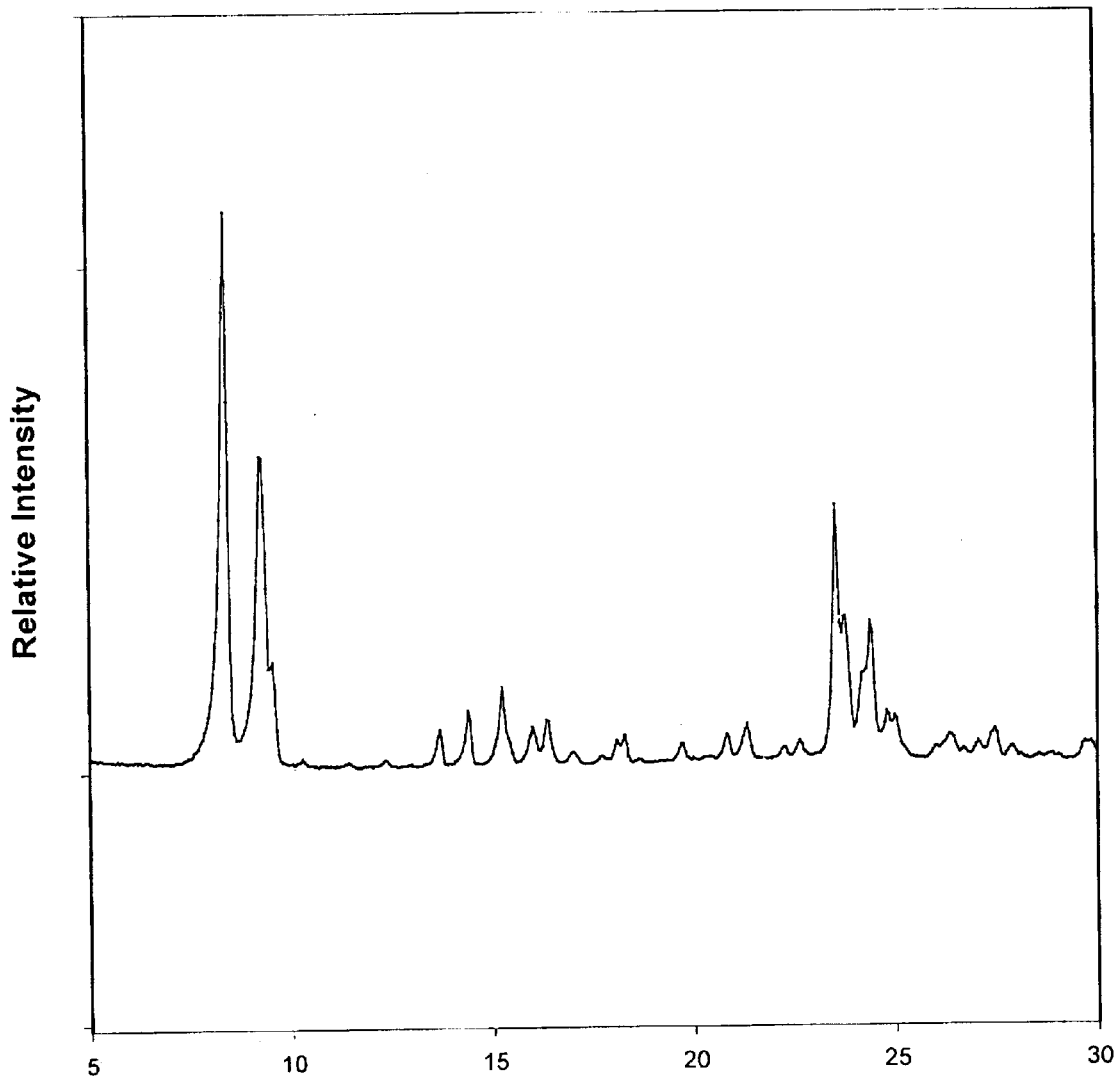
FIG. 14 is the XRD patterns of the example 10 of one preferred embodiment treating with 150 deg C. water vapor for 24 hours and then calcined at 550 deg C. according to the present invention.

Prepare a clear silicate solution the same as example 1 and heat it at 100 deg C. for 7 hours, cool to room temperature then add a solution containing 0.0259 g CTABr and 54.2732 g Ethanol and heat again at 100 deg C. for another 5 hours, adjust the pH value to about 10 using minutes. amount of dilute sulfuric acid, add a solution containing 1.0125 g CTABr and 54.27 g Ethanol to flocculate the zeolite precursors. Filter the flocculants, wash with the 200 ml ethanol, dry under room temperature for a day, and further at 70 deg C. for 3 hours. An organic-inorganic hybrid solid of 6.78 g is thus obtained. Press said solid into pellets using a pressure of 400 kg/m$^2$. Put them on a ceramic honeycomb 12 ml in volume inside a reactor of 190 ml volume, add 0.19 g DI water to the bottom of the reactor to generate steam in the reactor. The steam treatment is done at 150 deg C. for 24 hours. The pellets are recovered and heated in air to 300 deg C. at a rate of 5 deg C./min, then to 550 deg C. at a rate of 1 deg C./min. The product is then examined under transmission electron microscope (FIG. 13) and by XRD (FIG. 14). Nanometer size zeolite crystals of about 30 nm are thus confirmed.

EXAMPLE 11

To Produce About 5 Manometer Zeolite Crystals

Figure 15:
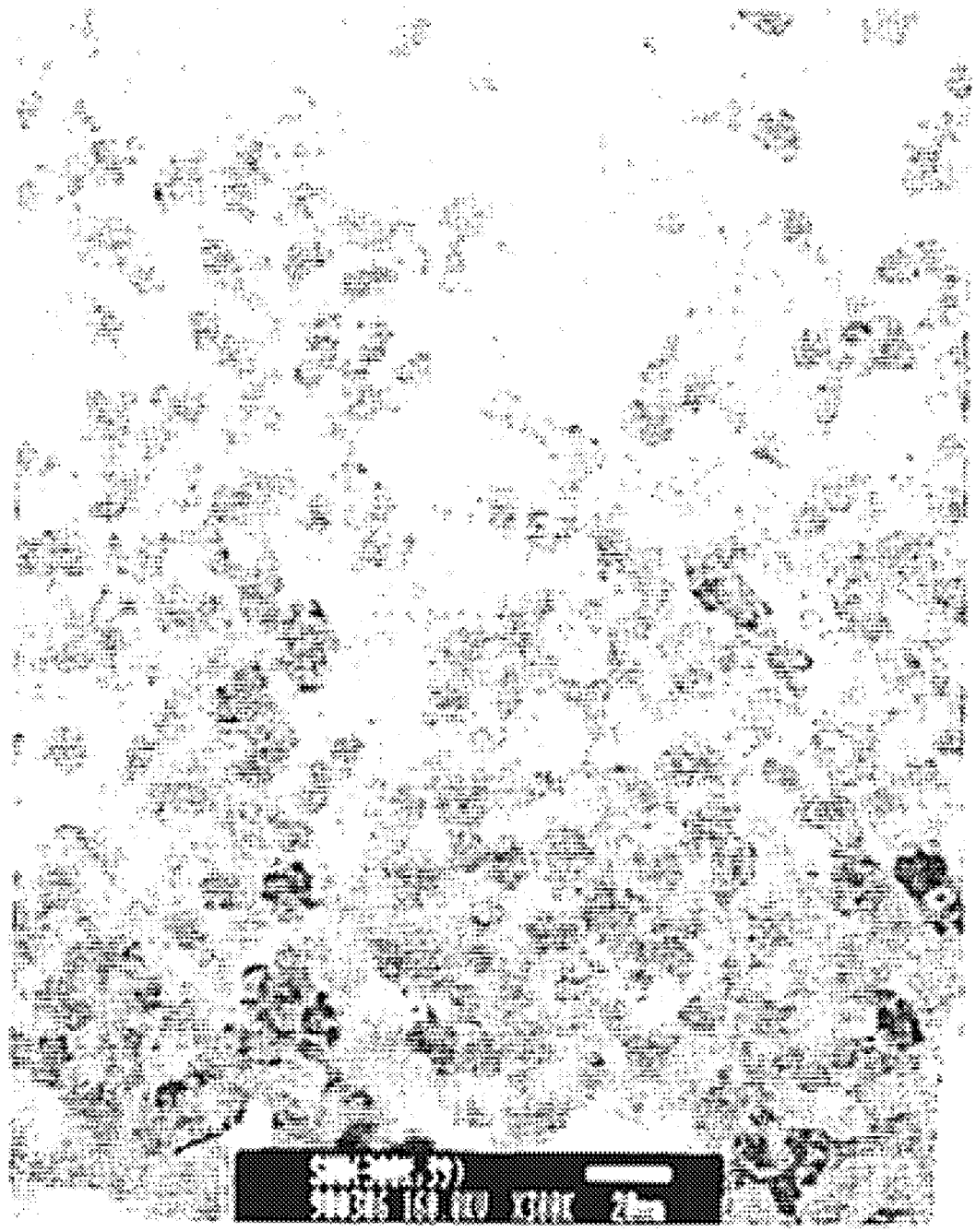
FIG. 15 is the TEM picture of the example 11 of one preferred embodiment treating with 150 deg C. water vapor for 24 hours and then calcined at 550 deg C., and then dispersed according to the present invention.
Figure 16:
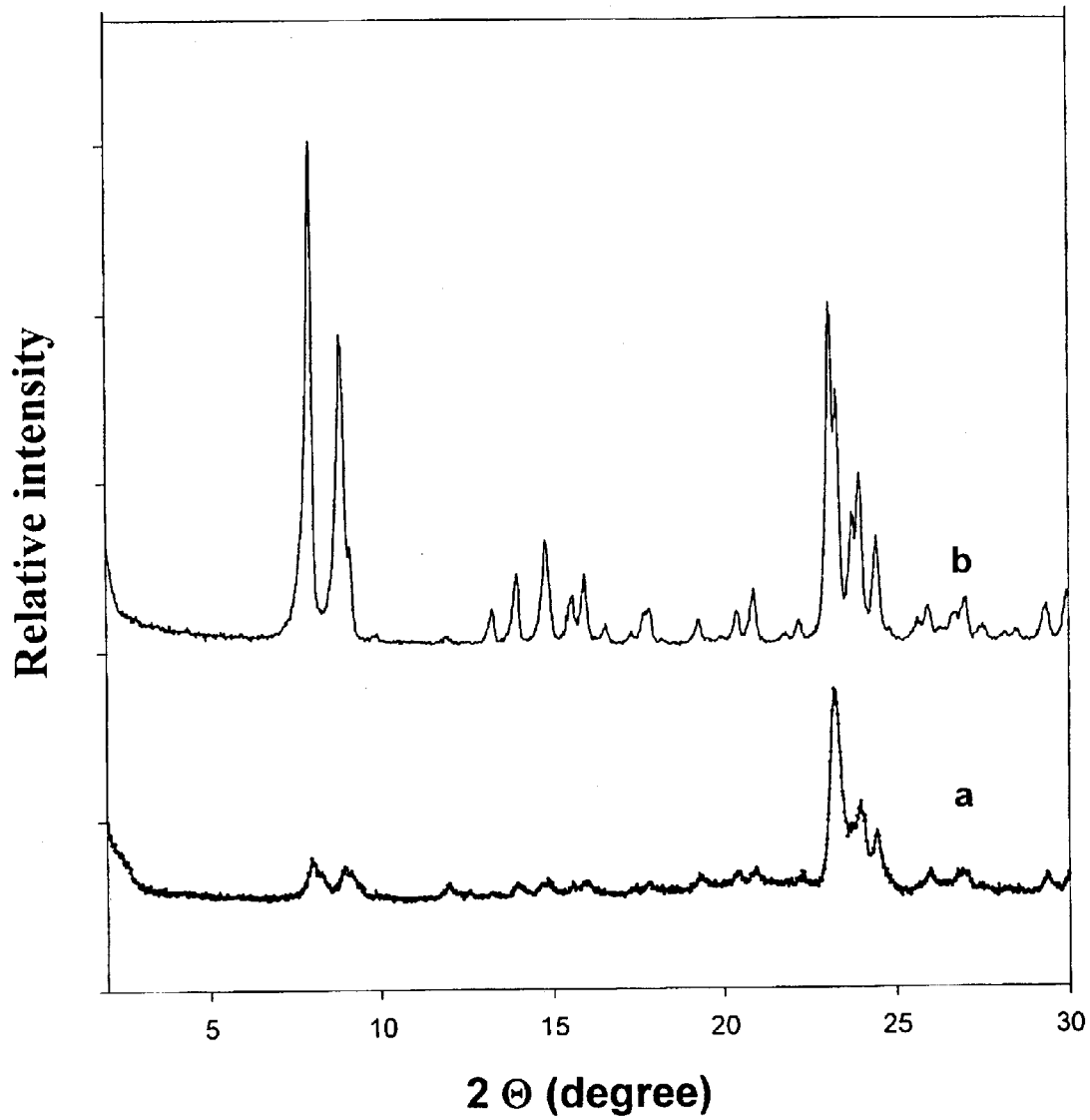
FIG. 16 is the XRD pattern of the example 11 of one preferred embodiment treating with 150 deg C. water vapor for 24 hours and then calcined at 550 deg C. according to the present invention.

Prepare a clear silicate solution the same as example 1 and heat it at 80 deg C. for 18 hours, whereas the solution remains clear without the formation of colloidal zeolite. Add a solution containing 1.0125 g CTABr and 54.2732 g Ethanol. Stir for 3 hours, filter the solid and rinse with the 300 ml ethanol, dry at room temperature for a day and further at 70 deg C. for 3 hours. Press the hybrid solid into pellets with a pressure of 400 kg/m$^2$. Put the pellets on a ceramic honeycomb 12 ml in volume inside a reactor of 190 ml volume, add 0.19 g DI water to the bottom of the reactor to generate steam in the reactor. Steam treating the solid at 150 deg C. for 24 hours. The pellets are recovered and heated in air to 300 deg C. at a rate of 5 deg C./min, then to 550 deg C. at a rate of 1 deg C./min for calcinations. The product is then examined under transmission electron microscope (FIG. 15) and by XRD (FIG. 16). Nanometer size zeolite crystals of about 5 nm are thus confirmed.

EXAMPLE 12

Controlling the Relative Humidity During Vapor Treatment

Figure 17:
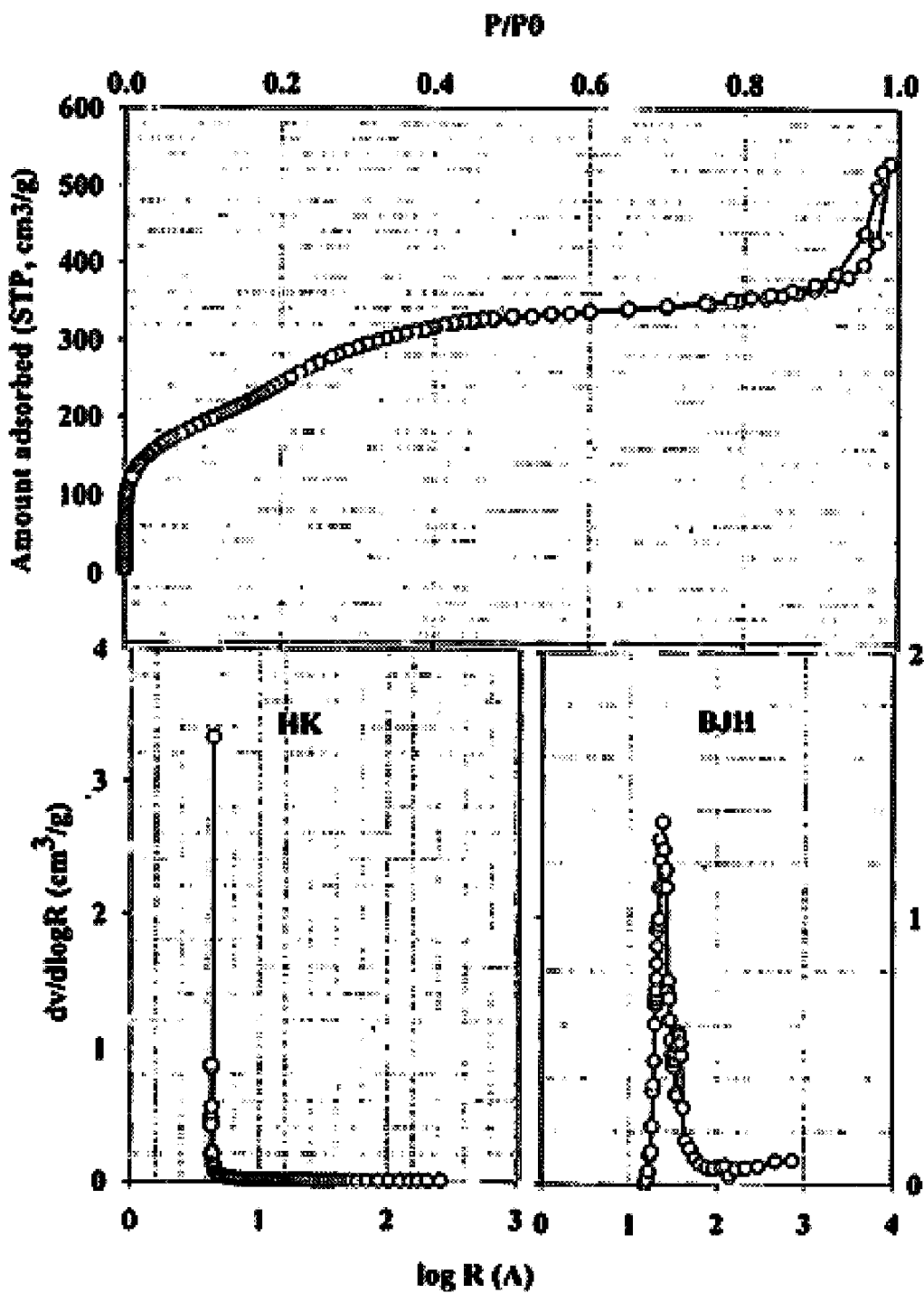
FIG. 17 is the 77 deg K. nitrogen adsorption isotherms of the example 12 of one preferred embodiment treating with 150 deg C. water vapor under a relative humidity of 40% for 24 hours and then calcined at 550 deg C. according to the present invention.
Figure 18:
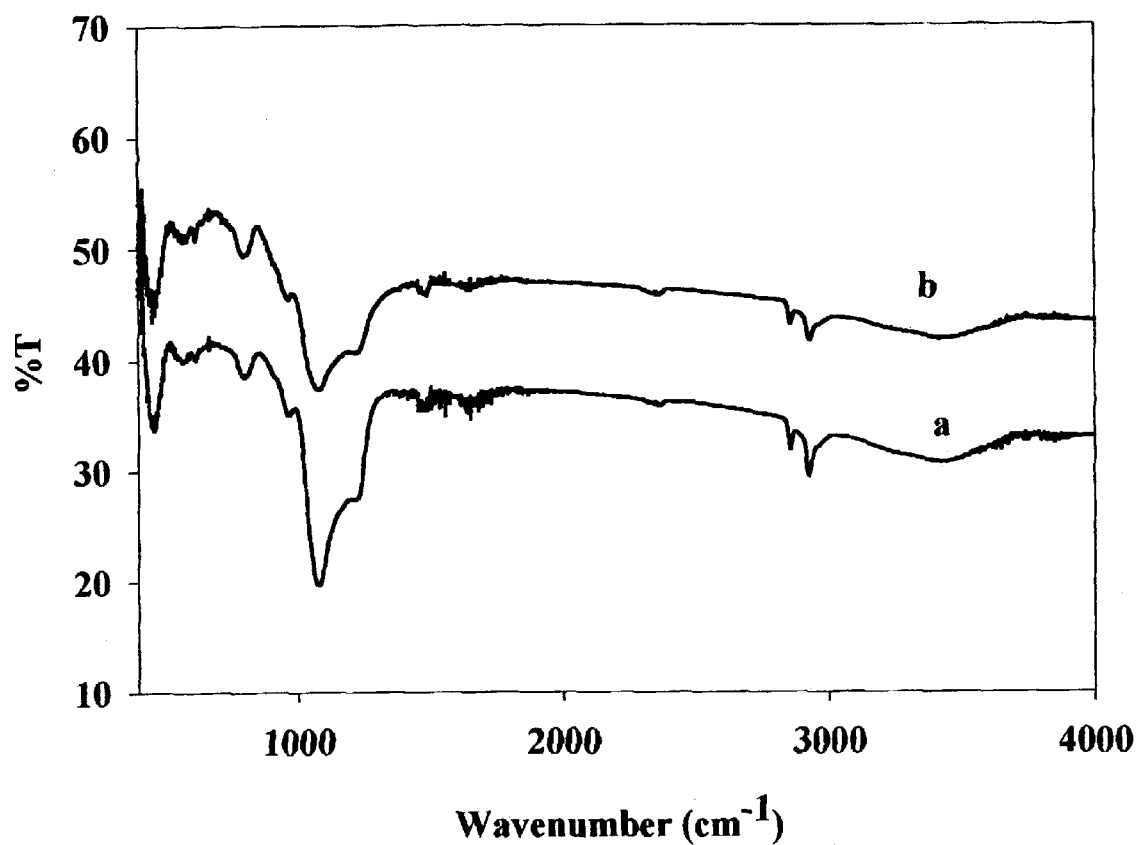
FIG. 18 is the FTIR spectra of the example 12 of one preferred embodiment (a) dry the sample at 70 deg C. after being filtrated for 3 hours (b)treating with 150 deg C. water vapor for 24 hours under a relative humidity of 40% according to the present invention.
Figure 19:
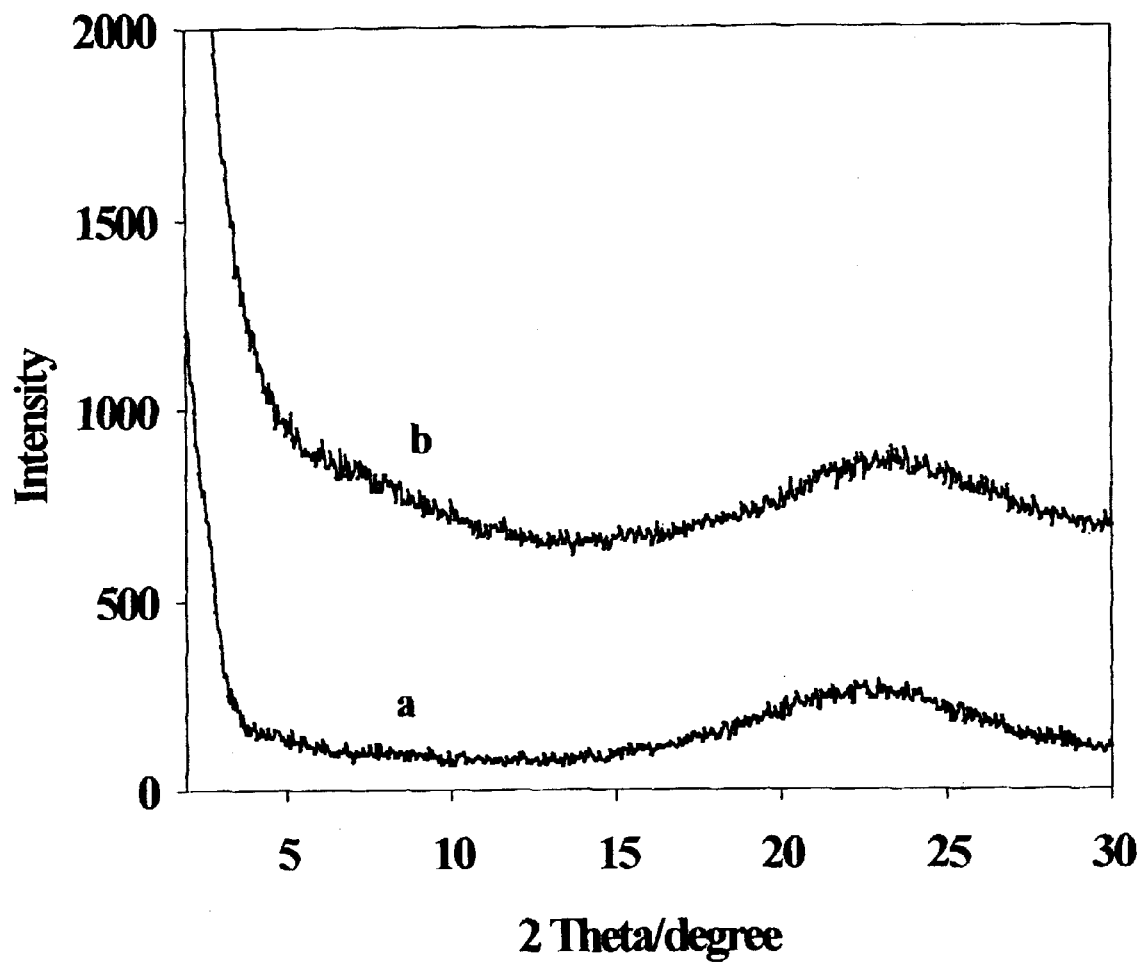
FIG. 19 is the XRD pattern of the example 12 of one preferred embodiment (a) dry the sample at 70 deg C. after being filtrated for 3 hours (b) treating with 150 deg C. water vapor for 24 hours under a relative humidity of 40% according to the present invention.

Prepare a clear silicate solution the same as example 1 and heat it at 80 deg C. for 18 hours, whereas the solution remains clear without the of colloidal zeolite. Add a solution containing 1.0125 g CTABr and 54.2732 g Ethanol. The pH value is adjusted from 12 to 10 by diluted acid. Stir the mixture for 36 hours, filter the solid and rinse with the 300 ml ethanol, dry at room temperature for a day and further at 70 deg C. for 3 hours. Press the hybrid solid into pellets with a pressure of 400 kg/m$^2$. Next to put them inside a reactor wherein the water steam is provided externally. Steam treating the pellets at 150 deg C. for 24 hours under a 40% relative humidity. The pellets are recovered and heated in air to 550 deg C. at a rate of 2 deg C./min for calcinations. The 77 deg K. nitrogen adsorption isotherm (FIG. 17) leads to a BET surface area of 910 m$^2$/g, whereas from the absorption peak at 550 cm$^{-1}$ of the FTIR spectrum (FIG. 18) confirms the formation of zeolite structure. However, no characteristic diffraction peaks of MFI zeolite can be observed in the XRD spectrum (FIG. 19), so it is inferred that the size of the zeolite structure obtained is smaller than that of previous example.

The examples mentioned as above are just limited cases of the preferred embodiments of this invention that are not used to limit the claims of this invention in practice. All the subject change and modification according to the shape, structure, characteristic and spirit mentioned according to the claims of this invention should be included within the claims of this invention.

What is claimed is:

1. A process for producing ultra-fine zeolite crystals and their aggregates wherein the steps are comprised of:
    (a) preparing a silicate-containing transparent solution capable of producing zeolite;
    (b) reacting said silicate-containing solution at 25–100° C. for a period of time while keeping the transparency of said solution unaltered so that the formation of colloidal zeolite is avoided;
    (c) adding an anionic surfactant to said solution to produce an organic-inorganic hybrid precipitate,
    (d) separating said organic-inorganic hybrid precipitate from the liquid;
    (e) molding precipitate into a shape;
    (f) steaming said shaped body of said organic-inorganic hybrid in a reactor under controlled relative humidity to convert the silicate components into zeolite crystals or their aggregates; and
    (g) burning off the organic components in the shaped body at a temperature of 500–800° C.

2. The process of claim 1, wherein in step (a) said silicate-containing transparent liquid contains ions of metals or organic template molecules.

3. The process of claim 1, wherein in step (b) said period of time is 10 to 48 hours.

4. The process of claim 1, wherein in step (b) the formation of colloidal zeolite can be avoided by adding a small dosage of anionic surfactant of less than 1% of the weight of silicate in the solution during the heating.

5. The process of claim 1, wherein in step (c) a pH value of said transparent solution is adjusted to between 10 to 11 by adding dilute acid before or after adding said surfactant.

6. The process of claim 5, wherein said acid is an inorganic acid of sulfuric acid, nitric acid or hydrofluoric acid.

7. The process of claim 1, wherein in step (c) the amount of said anionic surfactant added is 20–40% of the weight of the oxide contained in said silicate-containing solution.

8. The process of claim 7, wherein said anionic surfactant is dissolved in ethanol first to produce a solution contained about 2% surfactant.

9. The process of claim 1, wherein in step (f) said shaped body of said organic-inorganic hybrid precipitate is heated to 100°–200° C. for 1–3 days by steam, which may be provided from a build-in boiler or an outside steam source.

10. The process of claim 1, wherein the relative humidity in said reactor is 30–85%.

11. The process of claim 1, wherein in step (g) said organic components are burned off at a temperature of 400°–600° C. in air or under an inert gas mixed with air.

12. The process of claim 1, wherein said ultra-fine zeolite crystals and their aggregates produced by said process have a crystal size smaller than 30 nanometers, and an intracrystalline void size of 1–10 nanometers.

13. The process as recited in claim 2, wherein the metal ions are aluminum or titanium.

* * * * *